June 15, 1965   G. F. HAWKES, JR   3,189,865
WIRING DEVICE
Filed Oct. 16, 1961   4 Sheets-Sheet 2

WITNESSES:
Bernard R. Gieguen
Edward F. Possessky

INVENTOR
George F. Hawkes, Jr.
BY D. J. Smith
ATTORNEY

United States Patent Office 3,189,865
Patented June 15, 1965

3,189,865
WIRING DEVICE
George F. Hawkes, Jr., Bridgeport, Conn., assignor to Westinghouse Electric Corporation, East Pittsburgh, Pa., a corporation of Pennsylvania
Filed Oct. 16, 1961, Ser. No. 145,309
7 Claims. (Cl. 339—176)

The present invention relates to wiring devices and more particularly to wiring caps and connectors.

Whenever it is desired to establish an electrical connection between a pair of extension or other cords, it is customary to use a plug or cap which is attached to one of the cords and which is engageable with a connector attached to the other cord. The structural form of such a plug or connector desirably should be such as both to facilitate production in mass quantities and to provide operational, safety and other advantages in use.

According to the broad principles of the invention, a wiring device comprises an insulative housing in which a plurality of elongated terminal members are supported. The housing can be formed from separate parts and another insulative member can be used for holding the terminals in one of the housing parts, particularly during original assembly of the device or when the device is later disassembled for wiring purposes. A plurality of stranded or other wires are inserted through the housing and each of the terminals is provided with wire engaging means in such a manner that the wires can respectively be attached to the terminals subsequent to insertional movement of the former along the longitudinal direction of the latter.

In one species of the invention, each of the terminals is provided with a blade which extends through the housing so that the wiring device can be used as a plug or cap. In another species of the invention, each of the terminals is provided with blade engaging means so that the wiring device can be used as a connector. Other features of the invention will become more apparent hereinafter.

It is therefore an object of the invention to provide a novel wiring device in which wiring is accomplished in an efficient manner.

It is another object of the invention to provide a novel wiring device in which a plurality of elongated terminals are respectively supported in partitioned cavities and in which wiring is efficiently accomplished, with respective wires being insertable for engagement along the longitudinal direction of the terminals.

A further object of the invention is to provide a novel wiring device of the character described in the second object and in which an insulative member is used for holding the terminals in place, particularly during original assembly or subsequent disassembly of the device.

An additional object of the invention is to provide a novel wiring plug having the face side through which its blades extend closed from the exterior.

It is a further object of the invention to provide a novel wiring device having separate housing parts which can be assembled with each other through the visual aid of guide means.

Another object of the invention is to provide a novel wiring device as described in the second object and in which efficient means are provided for grounding one of the terminals.

These and other objects of the invention will become more apparent upon consideration of the following detailed description along with the attached drawings, in which.

Figure 1:
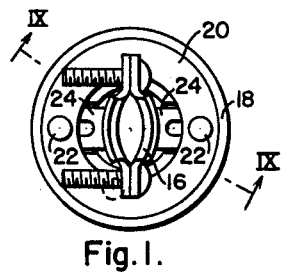
FIGURE 1 is a top plan view of an embodiment of the invention in the form of a plug.
Figure 2:
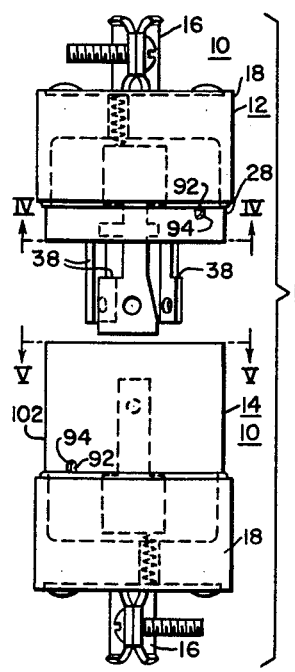
FIG. 2 is an elevational view of the plug shown in FIG. 1 in aligned relation with another embodiment of the invention in the form of a connector.

For the purpose of illustrating the principles of the invention, reference is now to be made to FIGS. 1 and 2. A wiring device 10 is provided both in the form of a plug 12 and a connector 14. Means are provided in the form of a cord clamp 16 on the plug 12 and on the connector 14 for holding respective insulated power wires or cords (not shown) in engagement with these devices against excessive pulling forces.

Figure 3:
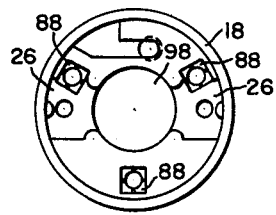
FIG. 3 is a plan view showing the outer side of a cover part used both for the plug and the connector.

As observed in FIGS. 1 and 3, the cord clamp 16 is supported relative to a cover part 18 which, as observed in FIG. 2, is a housing part common to the plug 12 and the connector 14. In order to hold the cable clamp 16 in operative position, an annular ring 20 can be secured to the cover 18 through the use of fasteners 22. In other applications, an armor cap (not shown) positioned over the cover 18 can be used in place of the ring 20. In this instance, the cable clamp 16 is provided with oppositely extending legs 24 which are captivated beneath the ring 20 and which can be moved along channels 26 in the outer side of the cover 18 for the purpose of enabling variously sized insulated wires or cords to be accommodated.

Housing means are provided for the plug 12 through the use of an insulative body part 28 in addition to the cover part 18. As viewed in FIGS. 2 and 4, a plurality of conductive terminals 30 and 32 having blades 34 and 36 are supported in the housing means or the body part 28. The blades 34 and 36 are provided with shoulders 38 for twisting and locking engagement with the connector 14 in a manner now well known. With this functional provision, the plug 12 and the connector 14 are especially suited for heavy industrial use.

As an advantage in safety, the plug body 28 is provided with a face side (FIG. 4) which is fully closed except for slots 40 and 42 through which the terminal blades 34 and 36 are extended. It is to be noted that lugs 44 are projected into the slots 40 and 42 for the purpose of obtaining stability in the support of the terminals 30 and 32. The length of the slots 40 and 42 is determined generally on the basis of the corresponding dimension of the outer end of the terminal blades 34 and 36 and it is therefore somewhat greater than the aligned dimension of the stem portion of those respective blades. Thus, to close the slots 40 and 42 against entry of foreign objects, the terminals 30 and 32 are each provided with a portion 46 which extends from within the body 28 into the respective slots 40 and 42.

Figure 9:
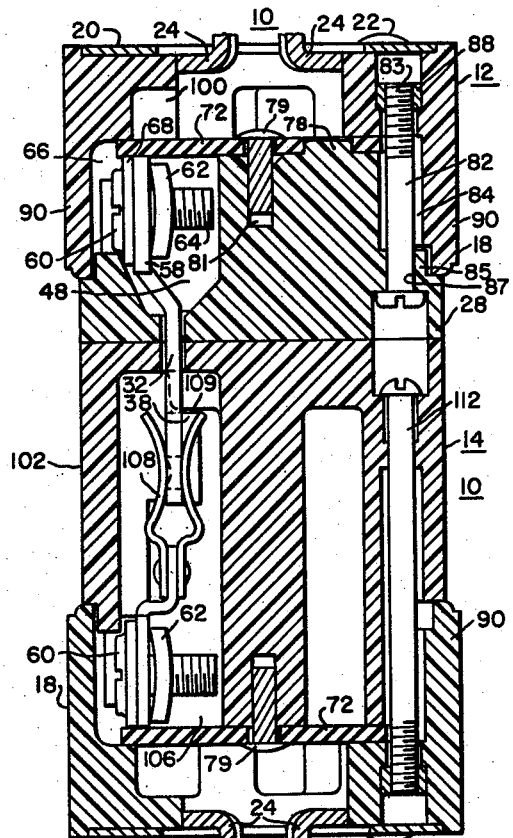
FIG. 9 is an enlarged cross sectional view of the connector and plug in connected relation with portions thereof removed and it is taken along the reference line IX—IX of FIG. 1.
Figure 8:
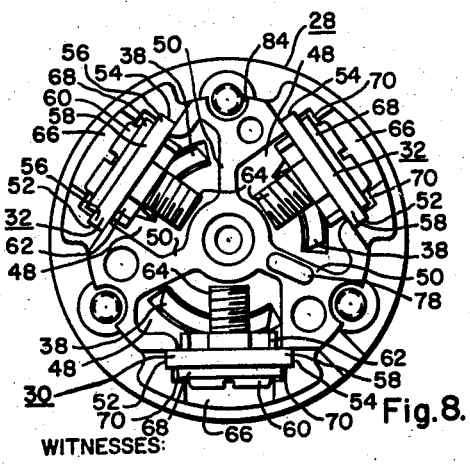
FIG. 8 is an enlarged top plan view of the plug body part shown in FIG. 4.

With reference to FIGS. 8 and 9, the terminals 30 and 32 extend longitudinally and inwardly of the body 28 and are supported in respective partitioned cavities 48. It is noteworthy that partition walls 50 can extend substantially along the entire length of the housed portions of the terminals 30 and 32 so as to isolate electrically these terminals from each other. To provide strength for the walls 50 and generally for the plug 12, an insulative material such as nylon can be used to form the body 28 and the cover 18.

Oppositely positioned grooves 52 and 54 face into each of the cavities 48 for insertional guidance and support of the terminals 30 and 32. The side of the plug body 28 which is viewed in FIG. 8 is open to the cavities 48 and the supporting grooves 52 and 54 extend inwardly from this open side to a limited extent so as to limit the extent to which wings 56 of an end portion 58 of each of the terminals 30 and 32 can be guided and thereby to limit the insertional movement of the terminals 30 and 32.

Each of the terminals 30 and 32 is provided with wire engaging means as a part of its innermost end. In this instance, the wire engaging means are preferably provided in the form of a threaded fastener or screw 60 and a nut 62 assembled with the end portion 58 of each terminal 30 and 32. A shank 64 of each screw 60 extends laterally through the terminal end portion 58 and inwardly of the adjacent body cavity 48. To provide access to the screw 60, each of the cavities 48 is open through a channel 66 to the outer side of the plug body 28. The screws 60 are captivated against longitudinal movement through the use of washers 68, which are integral with the screws 60, in conjunction with mating slots 70 facing into the respective cavities 48. A fuller explanation of the manner in which the screws 60 operate can be obtained by reference to U.S. Patent 2,899,524 of C. M. Smith, entitled Wiring Device, issued August 11, 1959 and assigned to the present assignee.

Twisting movement of each of the screws 60 results in movement of its mating nut 62 toward or away from the terminal portion 58. When it is desired to attach a wire to any of the terminals 30 or 32, it is only necessary to insert the wire (not shown) longitudinally into the cavity 48 between the nut 62 and the end portion 58 of the selected terminal 30 or 32. Tightening of the mating screw 60 then provides a firm conductive engagement of the wire.

Figure 7:
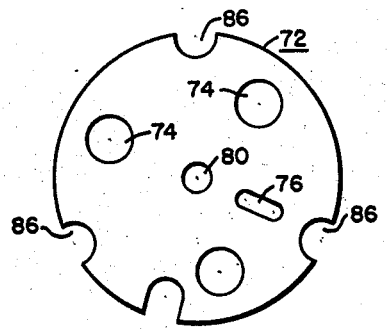
FIG. 7 is an enlarged top plan view of an insulative member used in both the plug and the connector.

In order to hold the terminals 30 and 32 within the plug body 28 prior to assembly of the latter with the cover 18 and in order to provide additional insulative isolation of the terminals 30 and 32 from each other, an insulative retaining member or disc 72 (FIG. 7) can be assembled over the open side of the body 28. As noted subsequently, the disc 72 can also be used in the connector 14. Openings 74 are provided in the disc 72 and are suitably located for entry of wires into the cavities 48 of the body 28. A slot 76 is also provided through the disc 72 as a key for alignment with a projection 78 on the body 28. If desired, a fastener 79 is passed through a disc opening 80 into a body opening 81 for the purpose of securing the disc 72 relative to the body 28. If the disc 72 is used and positioned as described, wiring is accomplished after the disc 72 is seated in the manner already set forth, and the cover 18 can then be placed over the open side of the body 28 for securance thereto in completing the assembly of the plug 12.

Figure 4:
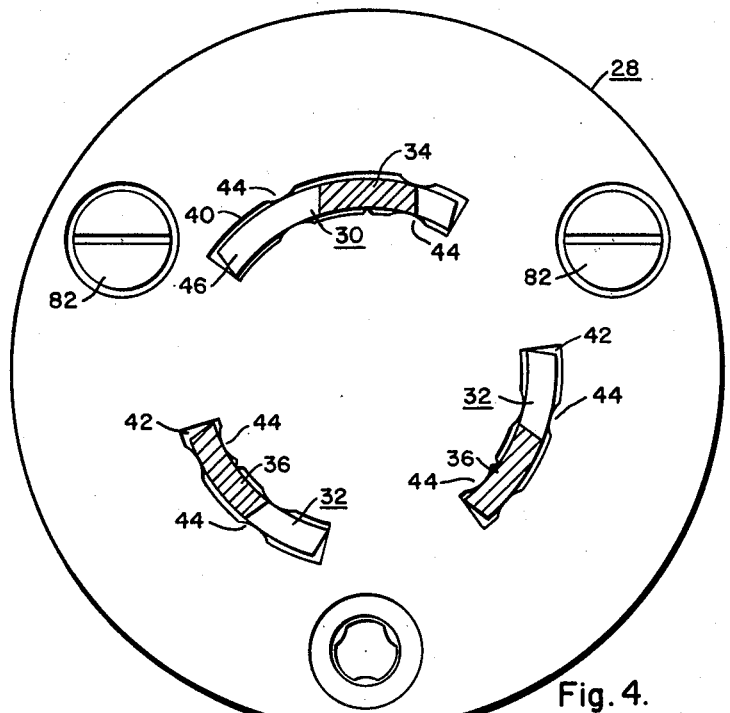
FIG. 4 is an enlarged bottom plan view of a body part of the plug with one of the securing fasteners removed.
Figure 5:
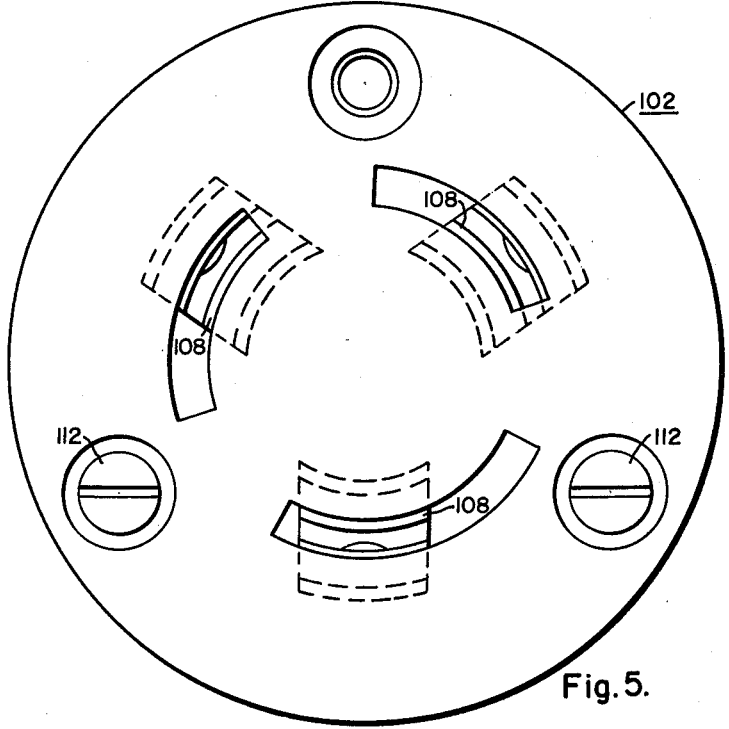
FIG. 5 is an enlarged top plan view of a body part of the connector.
Figure 6:
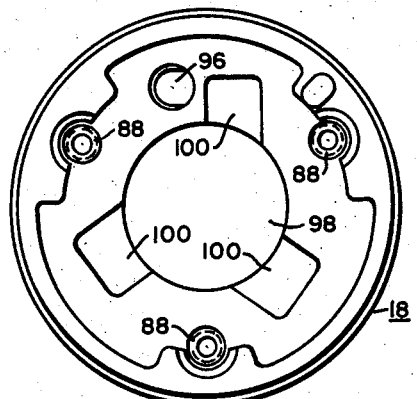
FIG. 6 is an enlarged plan view of the cover part showing an inner side thereof.
Figure 16:
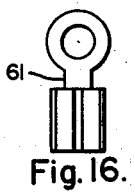
FIGS. 16–18 show a top plan view and elevational views of a resilient clip that can be used for grounding purposes.
Figure 17:
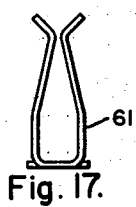
Figure 18:
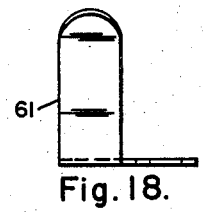
Figure 19:
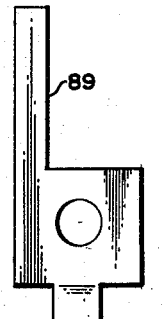
FIG. 19 shows a grounding terminal for use in the plug of FIG. 1.

Generally, as viewed in FIGS. 6 and 9, the cover 18 is formed for mating engagement with the body 28 and means for fastening these plug parts together can be provided in the form of threaded fasteners 82 which are threaded through the plug body 28 from its outer face (FIGS. 4 and 9). Opening 87 can be suitably threaded for this purpose. It is to be noted that the fasteners 82 are provided with a limited length of threading 83 to captivate the fasteners 82 relative to the plug body 28 yet to allow free twisting or limited longitudinal movement of the fasteners 82. Once inserted as described, the fasteners 82 extend through supporting portions 85 and recesses 84 in the plug body 28 and recesses 86 in the insulative disc 72 for engagement with the cover 18 or threaded inserts 88 (FIGS. 3 and 9) supported in the cover 18. When the cover 18 is assembled with the body 28, a side wall 90 of the cover 18 overlies the side of the body 28 so as to enclose the latter along with the wire engagement screws 60. If it is desired to ground one of the terminals 30 or 32, for example the terminal 30, a conductive member, such as a strip or a spring or a braided conductor, can be conductively extended between the terminal 30 and the metallic cover ring 20. For example, a tab 89 (FIG. 19) on terminal 30g can be extended through an opening (not shown) in the member 72 and through a cover passage 96 (FIG. 6) into engagement with a resilient female clip 61 (FIGS. 16-18) which is held between the ring 20 and the cover 18.

As a visual aid in the assembly of the cover 18 with the body 28, a projection 92 (FIG. 2) is provided on the cover side wall 90 for keyed alignment with a recess 94 in the side of the body 28. In this manner, mating engagement of the cover and body parts 18 and 28 is obtained without the inspection customarily required of the inner structure of separate housing parts in determining their positioning for mating engagement.

The wires which can be attached to the plug terminals 30 and 32 in the manner previously described commonly are provided in the form of a three-wire cord. In this instance, such a cord (not shown) extends into the plug 12 through the cord clamp 16 and through an opening 98 in the cover 18. To provide for separation of the respective wires and thereby to facilitate positioning of these wires for conductive engagement with the terminals 30 and 32, recesses 100 (FIG. 6) are provided in the cover 18. A previously suggested, the cable clamp 16 engages the cord so as to prevent pulling forces from being transmitted to the ends of the wires which are engaged with the terminals 30 and 32.

The connector 14, which can also be formed of an insulative material such as nylon, is provided with a form similar to that described for the plug 12. Thus, as an economy in manufacture, the cover 18 and the insulative disc 72 are used in the connector 14 in a manner identical with the manner in which use is made of these elements in the plug 12. Accordingly, elements which are alike in the plug 12 and the connector 14 are referenced identically.

The connector 14 is, however, provided with a body 102 which differs from the plug body 28. Generally, the connector body 102 can be more elongated than the plug body 28 so as to enable the use of conductive connector terminals 104 which are suitably formed and elongated for engagement with the plug blades 30 and 32. The connector terminals 104 are inserted through an open side (FIG. 10) of the connector body 102 and are supported in partitioned cavities 106 similar to the cavities 48 in the plug body 28.

Figure 10:
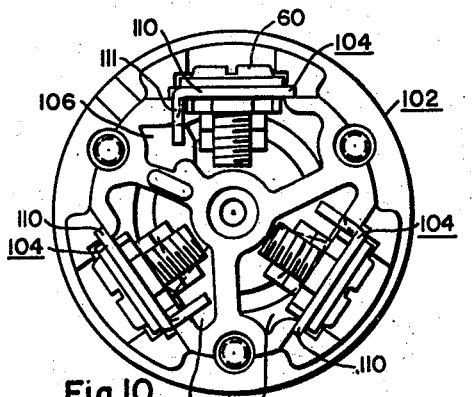
FIG. 10 is an enlarged bottom plan view of the connector body part shown in FIG. 5.
Figure 11:
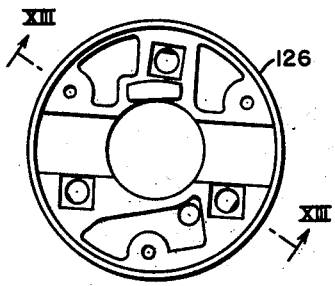
FIG. 11 is similar to FIG. 3 and shows the outer side of a cover part used with another plug and connector constructed in accordance with the principles of the invention.
Figure 12:
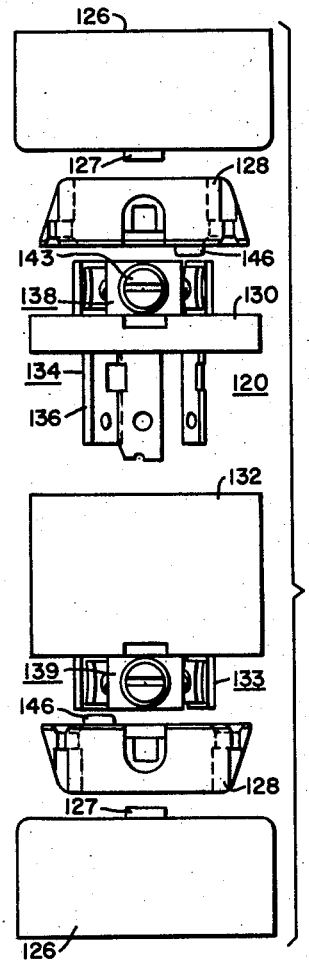
FIG. 12 is an exploded elevational view showing all of the parts of the other plug and connector in aligned relation.
Figure 13:
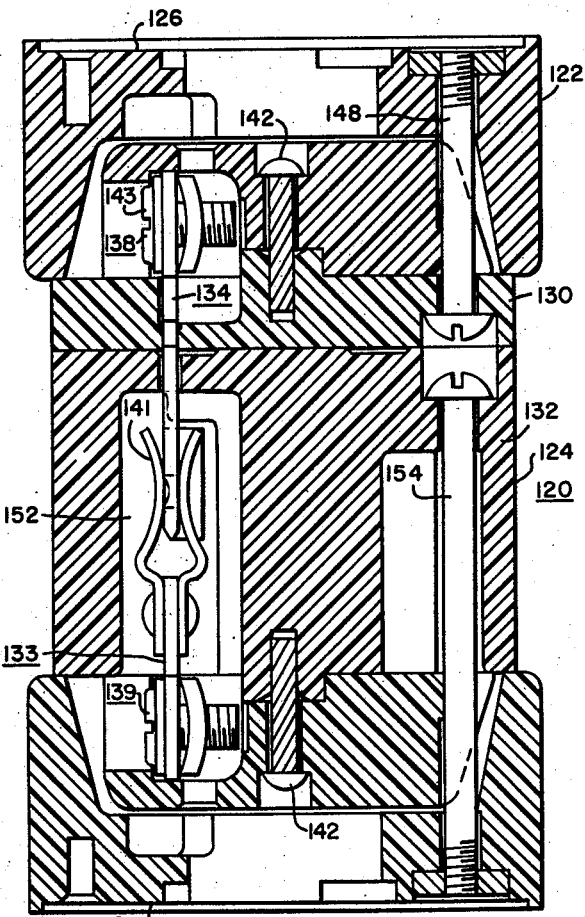
FIG. 13 is a cross sectional view of the other plug and connector in connected relation and it is taken along a reference line corresponding to the reference line XIII—XIII of FIG. 11.
Figure 14:
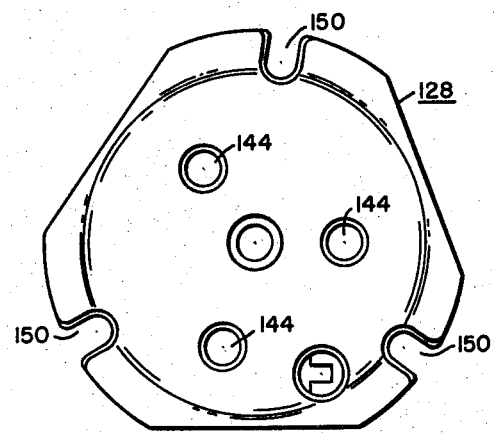
FIG. 14 is a top plan view of an insulative member used in both the plug and the connector of FIG. 12.
Figure 15:
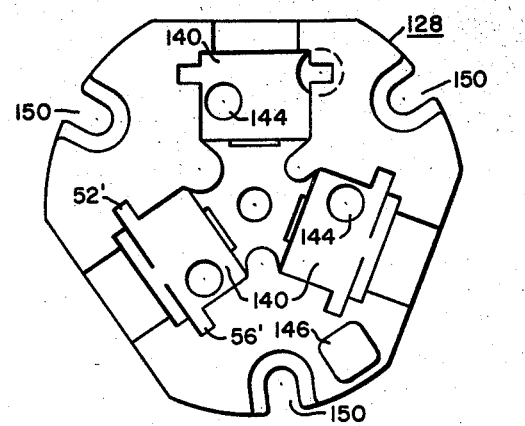
FIG. 15 is a bottom plan view of the insulative member shown in FIG. 14.

Adjacent one of the ends of each terminal 104, wire engaging means including the screw 60 and the nut 62 are provided. As an aid in holding the nuts 62 against rotation, each terminal 104 also includes a lateral projection 111 (FIG. 10). Adjacent the other end of each of the terminals 104, plug blade engaging means 108 are provided. Inwardly facing shoulders 109 are employed to establish a locking engagement with the shoulders 38 of the plug blades 30 and 32 when the latter are inserted into and rotated relative to the blade engaging means 108 of the terminals 104.

Wire engagement with the terminals 104 is accomplished in a manner similar to that described in connection with the plug 12. Thus, a wire (not shown) is inserted longitudinally between the nut 62 and an end portion 110 of the selected terminal 104 and tightening of the mating screw 60 results in conductive engagement of the wire.

Assembly of the connector 14 is also similar to that described in connection with the plug 12. Thus, the insulative disc 72 can be attached to the connector body 102 over the terminals 104 and the cover 18 is then placed over this combination and secured to the body 102 through the use of fasteners 112 which have limited threading for reasons similar to those previously considered in connection with the plug 12. When the connector 14 is placed in use, wiring is accomplished through the disc 72 with the cover 18 removed in a manner similar to that described for the plug 12. In this instance, the cover side wall 90 also functions to enclose (FIG. 9) the screws 60 when held in its assembled position. One of the terminals 104 can be grounded, if desired, by means similar or identical to those described in connection with the plug 12.

In FIGS. 11 through 15, there is shown another embodiment of the invention in the form of a wiring device 120. Similarly to the case of the wiring device 10, the wiring device 120 can be provided in the form of a plug 122 and in the form of a connector 124, each of which can include a grounded terminal if desired. Generally, the plug 122 and the connector 124 are respectively similar to the plug 12 and the connector 14 but differ therefrom in certain structural aspects.

A cover 126 and an insulative member 128 are provided for common use in the plug 122 and the connector 124. A body 130 of the plug 122 and a body 132 of the connector 124 are provided for supporting respective terminals 134 and 133 similarly to the case of the corresponding housing parts in the plug 12 and the connector 14. The plug terminals 134 are provided with blades 136 which extend through the plug body 130 and have wire engaging means 138 similar to the wire engaging means of the plug 12. The connector terminals 133 include wire engaging means 139 and, additionally, blade engaging means 141.

Since the wire engaging means 138 and 139 of the terminals 134 and 133 extend outwardly of the plug body 130 and the connector body 132 respectively, the insulative member 128 is so formed as both to hold the terminals 133 and 134 in supported position and to provide for additional lateral housing of these terminals. Thus, as viewed in FIG. 15, the insulative member 128 is provided with partitioned cavities 140 for reception of the wire engaging means 138, and each of the cavities 140 is open through the outer side of the insulative member 128 so as to provide access to screws 143 of the wire engaging means 138. Opposite grooves 52' and 56' face into each of the cavities 140 to hold the terminals 133 or 134 in place in a manner similar to that described for the grooves 52 and 54 in FIGS. 8 and 10.

A fastener 142 can be employed for securing the insulative member 128 either to the plug body 130 or the connector body 132. Wire passages 144 are provided through the insulative member 128 in a manner similar to those described in connection with the insulative member 72 in FIG. 7. As an assembly aid, a projection 146 is also provided on the insulative member 128 for keyed alignment with the plug body 130 or the connector body 132.

To assemble the plug 122, the terminals 134 are inserted into the insulative member 128 and the plug body 130 is properly keyed and secured over this combination. Wiring can then be accomplished according to the principles already described in connection with FIGS. 1 through 10 and finally the cover 126 can be placed over the plug body 130 to enclose the insulative member 128 and complete the assembly. A visible cover projection 127 provides a keyed relationship between the cover 126 and plug body 130. Securance is obtained through the use of fasteners 148 which have limited threading and which are extended through the plug body 130 and through recesses 150, provided in the insulative member 128, into engagement with the cover 126. As viewed in FIGS. 14 and 15, the recesses 150 can be open on one side to allow for side entry of the fasteners 148. In addition, the recesses 150 have a cross dimension which is less than the corresponding dimension of the threaded portion of each fastener 148. Thus, once the unthreaded portion of a fastener 148 is inserted through the side of a recess 150 (by tilting movement relative to the body 130) the fastener 148 is captivated against longitudinal withdrawal through the recess 150.

The connector 124 is similarly assembled. Thus, the terminals 133 are inserted into the insulative member 128 and the connector body 132 is then placed over the member 128 so that the terminals 133 extend into respective partitioned cavities 140 of the body 132. Wiring can then readily be accomplished and the cover 126 can be secured to the entire combination through the use of threaded fasteners 154 which are captivated relative to the insulative member 128 and the connector body 132 in a manner similar to that described in connection with the plug 122.

In the foregoing description, several structural arrangements have been described in order to point out the principles of the invention. Accordingly, the description has been illustrative of the invention and it is desired that the invention be not limited by the embodiments described herein but, rather, that it be accorded an interpretation consistent with the scope and spirit of its broad principles.

What is claimed is:

1. An elongated wiring device comprising an insulative body having at least one blade opening through a frontal end surface thereof and an insulative cover having a rearward end surface longitudinally spaced from said frontal end surface of said body, said cover having an opening therethrough for entry of a wire, at least one elongated conductive member supported on an inner surface of said body, a threaded fastener extending in the device in a lateral direction through a terminal end portion of said conductive member for engaging the wire, an insulative retaining member disposed on said body and cooperatively forming therewith a generally enclosed pocket in which at least said conductive member terminal portion is supportedly disposed, said retaining member secured to said body so as to secure said conductive member in place and further having an opening therethrough in alignment with said terminal end portion for wire insertion in the device in a longitudinal direction, a channel extending from said pocket in the device in an outward lateral direction for operating access to said threaded fastener, the outermost lateral contour of said retaining member and the outer limit of said channel contained within the outermost lateral contour of said body, said cover disposed in longitudinally mating engagement with said body so as to enclose said retaining member and said channel, and means for holding said body and said cover in secured relation.

2. An elongated wiring device comprising an insulative body having a plurality of blade openings through a frontal end surface thereof and an insulative cover having a rearward end surface longitudinally spaced from said frontal end surface of said body, said cover having an opening therethrough for entry of a cord, a plurality of conductive members corresponding in number to the number of said blade openings and supported on an inner surface of said body, a threaded fastener extending in the device in a lateral direction through a terminal end portion of each of said conductive members for engaging respective wires of the cord, an insulative retaining member disposed on said body and cooperatively forming therewith respective generally enclosed pockets in which at least said conductive member terminal portions are respectively supportedly disposed, said retaining member secured to said body so as to secure said conductive members in place and further having respective openings therethrough in alignment with the respective terminal end portions for insertion of the respective wires in the device in a longitudinal direction, a channel extending from each of said pockets in the device in an outward lateral direction for operating access to the respective threaded fasteners, the outermost lateral contour of said retaining member and the outer limit of said channels contained within the outermost lateral contour of said body, said cover disposed in longitudinally mating engagement with said body so as to enclose said retaining member and said channels, and means for holding said body and said cover in secured relation.

3. An elongated wiring device comprising an insulative body having a plurality of blade openings through a frontal end surface thereof, a plurality of conductive members corresponding in number to the number of said blade openings and supported on an inner surface of said body, a threaded fastener extending in the device in a lateral direction through a terminal end portion of each of said conductive members for engaging respective wires of a cord, an insulative retaining member disposed on said body and cooperatively forming therewith respective generally enclosed pockets in which at least said conductive member terminal portions are respectively supportedly disposed, said retaining member secured to said body so as to secure said conductive members in place and further having respective openings therethrough in alignment with the respective terminal end portions for insertion of the respective wires in the device in a longitudinal direction, a channel extending from each of said pockets in the device in an outward lateral direction for operating access to the respective threaded fasteners, the outermost lateral contour of said retaining member and the outer limit of said channels contained within the outermost lateral contour of said body, a cover disposed in longitudinally mating engagement with said body so as to enclose said retaining member and said channels, means for holding said body and said cover in secured relation, and a conductive element conductively extending from the terminal end portion of one of said conductive members through another opening in said retaining member for conductive engagement with suitable grounding means.

4. An elongated wiring device as set forth in claim 2, wherein the lateral contour of at least the respective portions of said pockets in which the respective terminal end portions are disposed are defined by said retaining member, and said channels extend laterally through said retaining member.

5. An elongated wiring device as set forth in claim 2, wherein each of said conductive members includes a blade extending through a blade opening in alignment therewith so that said wiring device is provided in the form of a plug.

6. An elongated wiring device as set forth in claim 2, wherein each of said conductive members includes blade engaging means respectively in alignment with said blade openings so that said wiring device is provided in the form of a connector.

7. An elongated wiring device as set forth in claim 2, wherein the lateral contour of each of said pockets is defined by said body, said channels extend laterally through said body, and said retaining member is generally flat and disposed on said body so as to serve as a cover for said pockets.

References Cited by the Examiner
UNITED STATES PATENTS

| | | | |
|---|---|---|---|
| 1,443,449 | 1/23 | Wise et al. | |
| 1,491,394 | 4/24 | Griffith et al. | |
| 1,750,014 | 3/30 | Lofgren | 339—14 |
| 2,105,465 | 1/38 | Bannon | 339—185 |
| 2,262,712 | 11/41 | Shenton | 339—263 |
| 2,272,178 | 2/42 | McDowell. | |
| 2,627,567 | 2/53 | Bell | 339—191 |
| 2,682,646 | 6/54 | Hubbell | 339—14 |
| 2,810,116 | 10/57 | Webster et al. | 339—103 |
| 2,899,524 | 8/59 | Smith | 339—272 |
| 2,927,297 | 3/60 | Hubbell | 339—210 |
| 2,930,022 | 3/60 | Webster | 339—103 |
| 2,958,068 | 10/60 | Lipinski | 339—195 |
| 3,023,395 | 2/62 | Hubbell et al. | 339—263 |

JOSEPH D. SEERS, *Primary Examiner.*